OR  3,345,120

Oct. 3, 1967   R. B. PALMER   3,345,120
LIGHT SPOT APPARATUS

Filed Sept. 6, 1963   3 Sheets-Sheet 1

INVENTOR.
ROBERT B. PALMER

Oct. 3, 1967  R. B. PALMER  3,345,120
LIGHT SPOT APPARATUS
Filed Sept. 6, 1963  3 Sheets-Sheet 2

INVENTOR.
ROBERT B. PALMER
BY

Oct. 3, 1967  R. B. PALMER  3,345,120
LIGHT SPOT APPARATUS
Filed Sept. 6, 1963  3 Sheets-Sheet 3

INVENTOR.
ROBERT B. PALMER
BY

United States Patent Office 3,345,120
Patented Oct. 3, 1967

3,345,120
LIGHT SPOT APPARATUS
Robert B. Palmer, Shoreham, N.Y., assignor to the United States of America as represented by the United States Atomic Energy Commission
Filed Sept. 6, 1963, Ser. No. 307,273
4 Claims. (Cl. 350—6)

ABSTRACT OF THE DISCLOSURE

Apparatus for scanning bubble chamber pictures for the rapid, electronic recording, interpretation and selection of bubble chamber picture tracks having optical light transmitting elements that produce a moving light spot by illuminating the small area of the intersection of the projections of a stationary glass fiber and a glass fiber curved radially outwardly on a rotatable disc.

---

In scanning bubble chamber pictures for the automatic electronic recording, interpretation and selection of the bubble chamber picture tracks, it has been desirable to provide an optical system of lenses for producing a uniform, high light flux, small 15 μm. diameter light spot that moves uniformly, precisely in straight line segments across moving bubble chamber film transverse to the direction of the film movement. It has additionally been desirable to provide a simple and effective apparatus of producing the spot that has been easy to maintain and operate by providing a lens system that is free of dust catching slits while providing for a selectively variable spot size and shape.

It is thus an object of this invention to provide improved light spot apparatus for providing a light spot consisting only of light rays traversing a light transmission element from a fixed source of illumination;

It is another object of this invention to provide an improved light spot apparatus for scanning bubble chamber pictures;

It is another object of this invention to provide a compact, simple light spot apparatus that is easy to produce and inexpensive to maintain.

It is another object of this invention to provide a small flying light spot with constant light intensity, constant velocity and high light flux;

It is a further object of this invention to provide a light spot whose size and shape are easily changed.

In accordance with this invention a small light spot is provided for scanning bubble chamber pictures produced with the eighty inch bubble chamber for the Brookhaven 33 bev. Alternating Gradient Synchrotron. The system involved in this invention utilizes standard and well known techniques and apparatus and is highly flexible for a wide range of applications, light sources, light spot sizes and shapes, bubble chamber film sizes, bubble chamber film particle track widths and ambient conditions. More particularly, this invention involves the use of a system of fixed and rotatable cylindrical lenses which are used to focus light into an image of its source. The system of cylindrical lenses are arranged in one embodiment with fixed and rotating glass fiber lenses that produce an astigmatic image of the source, and a lens for correcting this astigmatism. With the proper selection of lenses as hereinafter to be more particularly described, it is possible by this invention to obtain the desired light spot.

Various other objects and advantages will appear from the following description of several embodiments of this invention, and the novel features will be particularly pointed out hereinafter, in connection with the appended claims.

In the drawings where like parts are marked alike:

Figure 1:
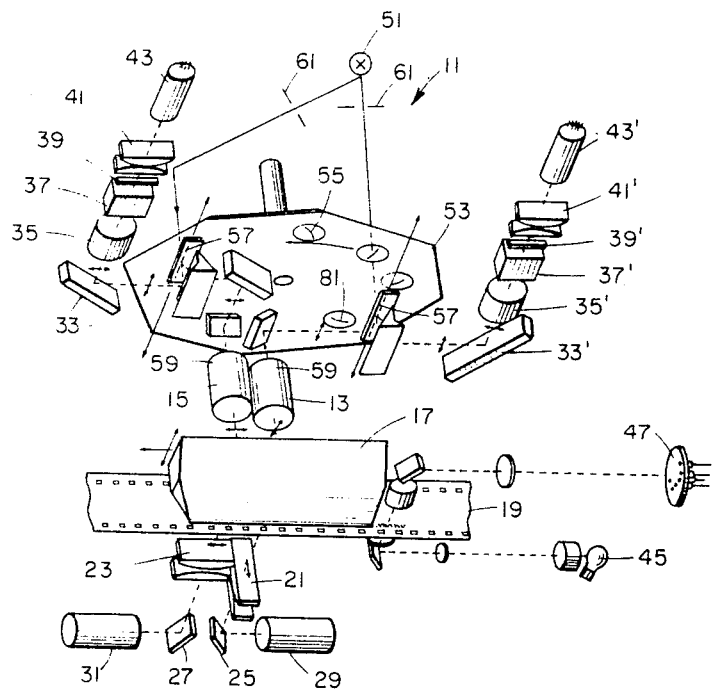
FIG. 1 is a partial isometric view from the bottom of a flying spot bubble chamber picture measuring machine with the crossed fiber elements of this invention.

Referring now to FIG. 1, flying spot apparatus 11 is shown in which flying spots are projected through lenses 13 and 15, are reflected by prism 17 so as to pass through bubble chamber film 19 at right angles to the plane of the film 19, are condensed by condensers 21 and 23, and reflected by mirrors 25 and 27 into photomultiplier tubes 29 and 31 for recording and analysis e.g. with digitizers and electronic computers (not shown). The light spots passing through projection lens 13 move normally to the direction of the travel of film 19. The light spots passing through protection lens 13 move normally to this direction or this movement of film 19 and corresponding light spots progress from mirror 33, through projection lens 35, glass block 37, grating 39 and condensers 41 to photomultiplier 43. This latter photomultiplier cooperates with the above-mentioned photomultiplier 31 and its digitizer and computer to determine the position of the spot passing through the film 19. A light beam from lamp 45 shines through a binary picture number on films 19 so that the frame number of the bubble chamber film 19 can be determined by photo-transistors 47.

The light spot passing through film 19 must move rapidly and accurately in a straight line segment with high light constancy in order to determine the curvature and angle of the tracks on film 19. The accuracy required is equivalent to an accuracy of coordinate determination of about ±5 μm. or less. Also, in scanning eighty inch bubble chamber pictures, the scan frame area is 53 x 160 mm., and the spot should be as small as about 15 μm. in diameter and advantageously have a high flux to provide reasonably low signal to noise ratios in the photomultipliers 29, 31 and 43. The film 19 is moved on suitable means (not shown) whereby the scan lines are 30μ apart and the scan time is about 10 seconds per picture frame.

In accordance with this invention light from source 51 passes from the top of rotatable disc 53 through curved, first, 1 mm. diameter, hand drawn, cylindrical, glass fiber lens 55, mounted for rotation on disc 53. It has been discovered that if this fiber is curved into a suitable involute, the same diameter and focusing properties are provided as in its straight condition. To this end the fiber 55 is curved by allowing it to sag in an oven into a machined form of the desired shape since any fine irregularities in the form are not imparted to the fiber.

Figure 2:
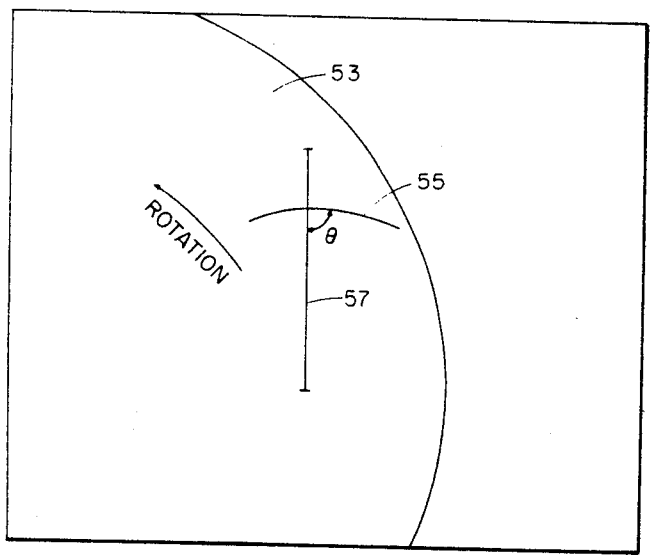
FIG. 2 is a partial side view of the fibers of FIG. 1 looking toward the light source therefor.

The light from source 51 passes through a first fiber 55 on disc 53 and through a straight, cylindrical second glass fiber lens 57 respectively. This straight fiber is a 1 mm. diameter hand drawn fiber and is held under a tension of about 2 kgm. thereby to maintain its straightness within a small fraction of one micron. This straight fiber 57 is also slightly offset so that when looking through the intersection of the fibers 55 and 57 from the side opposite the light source 51, this intersection is always perpendicular e.g. as shown in FIG. 2. Thus the second fiber 57 is orientated in a plane perpendicular to the path of light rays transmitted through fiber 55 from source 51 whereby the second fiber 57 is always traversed by the light rays passing through the first fiber perpendicular to the second fiber. Since this described insertion is always perpendicular, the uniform rapid rotation of the first fiber 55 produces a high speed, constant velocity, high flux, light spot image of source 51 which accurately scans a line segment. In contrast, if both fibers were straight, the spot would not move with a constant velocity.

Figure 3:
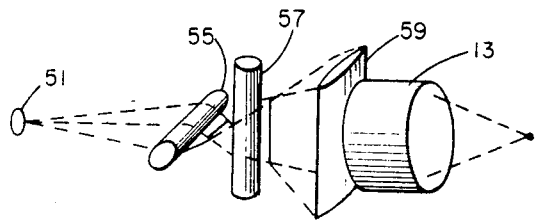
FIG. 3 is a partial schematic view of the crossed fiber lens system of FIG. 2.

These fibers 55 and 57 form first and second line images of the source 51 parallel with each fiber (as illustrated schematically in FIG. 3). The fibers are small in diameter and their focal length is small. Thus when these two line images are viewed together from the side opposite the source 51, they form a high flux single, small spot image of the source 51. It will also be understood from the above, that the described intersection of fibers 55 and 57 defines an aperture in which there are two crossed glass fibers, each of which acts as a cylindrical lens. Together these lines act as one spherical lens which forms an image of source 51.

The cylindrical first and second lenses 55 and 57 produce small amounts of astigmatism in light spot image of soure 51. Only if this astigmatic image is projected with a lens to which a weak cylindrical element is added will a single corrected image of the source be formed on film 19. In this regard, the perpendicular crossing of the fibers 55 and 57 permits the full correction of this astigmatism. Thus low power cylindrical lens 59 transmits the image of source 51 through a projection lens such as lens 13 or lens 15, resulting in a constant light intensity, astigmatism-free, small, high flux light spot image of source 51 onto film 19. A light flux gain, for example 3.5, is also achieved thereby.

Because of the astigmatism of the images from fibers 55 and 57, no single point near the fibers is conjugate with the spot image on the film. Thus no single particle of dirt near the fibers can block out the spot. Additionally, there is no problem with ragged edges and non-constancy of the light intensity with the fibers 55 and 57 since it is relatively easy to obtain fibers whose diameters are constant to a small fraction of one percent.

The above described system of this invention also has the advantage that since the spot produced thereby is a real image of the source 51, the spot size and shape may easily be varied by placing an iris 61 in front of the source 11. Moreover, by placing a suitable line element or other stop in front of the source 51, the spot may have the form of a line or other shapes with which to facilitate the change in resolution by the spot. In contrast, such an iris or stop could not be used to produce the desired change in resolution if slits were used in place of the fibers of this invention.

Figure 5:
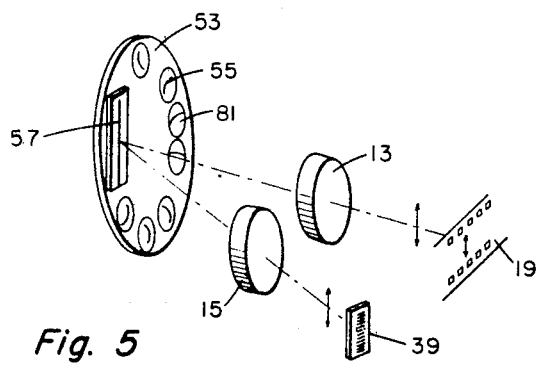
FIG. 5 is a partial schematic view illustrating the wide cone of light provided with the crossed fiber system of this invention.

The above described system additionally has the advantage that a very large cone of light leaves the crossed fibers 55 and 57, and this cone of light is not a function of the illumination system. Thus objectives of very large aperture can be used without changing the lamp of arc source 51 and no light splitter need be used which decreases the flux of the flying spots produced by the fibers. Thus identical flying spots enter photomultipliers 31 and 29 as shown in FIG. 1. It will also be understood that because of this wide cone of light from fibers 55 and 57, that several objectives may be set up to project identical flying spots at different angles as shown in FIG. 5 where the light from source 51 passes through disc 53 and illuminates the whole curved fiber 55.

In considering how a small, high light flux light source 51 can be used in the fiber system of this invention, the flux F in the spot produced is given by $F = A\Omega B$ where A is the geometrical area of the spot on the film 19, $\Omega$ is the solid angle subtended by the projection lens stop at the film 19, and B is the luminance of the source 51. Accordingly, the flux F can be increased if a lamp with increased luminance B can be employed. Generally, the smaller the arc of the source 51 the more is its luminance.

Figure 4:
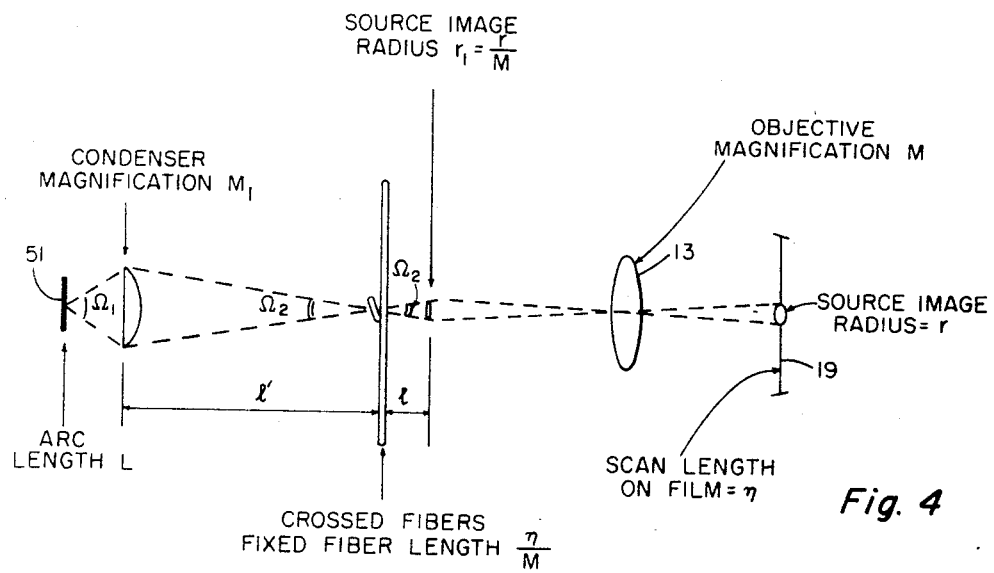
FIG. 4 is a diagrammatic view of elements of FIG. 1.

In order to show that a small or high luminance lamp can be used in accordance with this invention, reference is made to FIG. 4 for calculating the minimum size lamp. The scan length across the film in a plane at point P is $\eta$, the length of the second fiber 57 is $\eta/M$ and the arc length of the source 51 is given by $$L = \frac{\eta}{MM_1}$$

where M is the objective magnification and $M_1$ is the magnification of the condenser therefor. For a spot source image on the film of radius $r$, the source image just behind the fibers 55 and 57 must be $$r_1 = \frac{r}{M}$$

where M is again the objective magnification. The solid angle of light $\Omega_2$ leaving the fibers is then given by $$\Omega_2 = \frac{\pi r_1^2}{l^2} \qquad (1)$$

where $l$ is the conjugate distance from the fiber to the source image. Since this conjugate is very small compared to the long conjugate $l'$, $l$ is approximately equal to the fiber focal length $f$.

Thus:

$$\Omega_2 \approx \frac{\pi r_1^2}{f^2} = \frac{\pi r^2}{M^2 f^2}$$

and the solid angle at the source $\Omega_1$ is $$\Omega_1 = \frac{M_1^2}{M^2} \frac{\pi r^2}{f^2}$$

setting an upper limit on this condenser aperture, $\Omega_1$ max., $$M_1 = \frac{Mf}{r} \sqrt{\frac{\Omega_1 \text{ max.}}{\pi}}$$

Using expression (1) the arc length can be expressed by $$L = \frac{1}{M^2 f} \eta r \sqrt{\frac{\pi}{\Omega_1 \text{ max.}}} \qquad (2)$$

In this fiber system, Equation 2, the arc length of source 51 is seen to be a function of both $f$, the focal length of the fibers, and of M, the magnification of the objective. Thus with reasonable choices of $f$ and M the value of L can be reduced to a very small value whereby a small high flux light source 51 can be used with the system of this invention. Also, since these sources can be smaller higher flux sources than were used heretofore it is possible to increase the spot light flux with this invention by using these smaller higher flux light sources.

Figure 6:
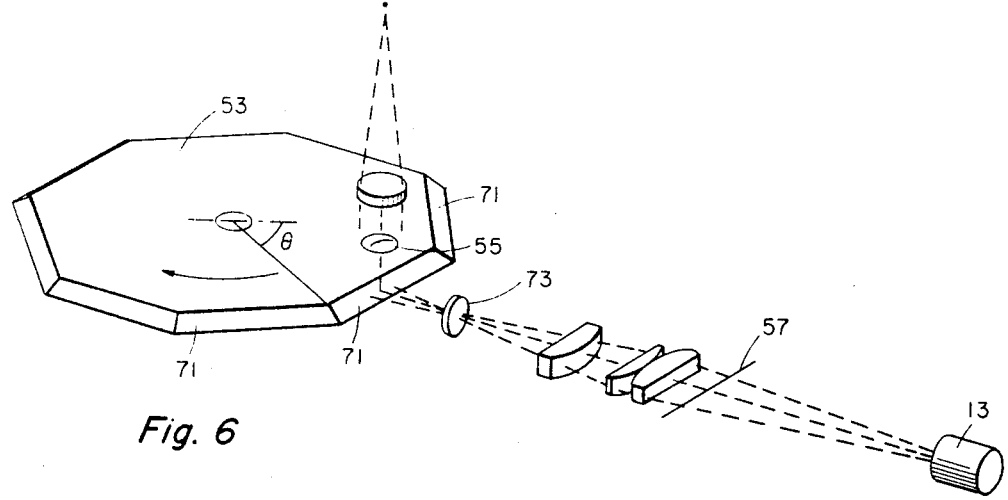
FIG. 6 is a partial schematic view from the top of the apparatus of FIG. 1.

In a practical arrangement for the crossed fibers of this invention, a small region of fixed fiber 57 that follows the point of intersection of the fixed and moving fibers is illuminated. To this end the light from source 51 is focussed into a parallel beam which falls on to 45° mirrored faces 71 of disc 53, as shown in FIG. 6. The angle of the parallel light reflected off the disc moves with the angle of the disc 53. The parallel light leaving the disc is focussed by a fixed lens 73 to a point on the fixed fiber 57 and, as the disc rotates, so this point moves along the fixed fiber 57.

Field lenses inserted before the fixed fiber 57, perform two functions. Firstly, they focus the light so that it is heading for the projection lens 13. In this way the fibers are used "on axis." Secondly, these field lenses are designed to provide a constant velocity of movement of the spot given constant angular velocity of the disc. Since the intersection of the fixed and involute moving fibers also moves with a constant velocity it only remains to synchronize the rotation of the mirrored disc with a rotating disc holding the moving fibers.

A simple way of obtaining this synchronization is to use one and the same disc 53 for this purpose. To this end, after the light is reflected from the 45° mirrored faces 71 it is bent round by reflection in a number of prisms 77 and brought down again on to the disc 53 in the correct position to follow the fiber intersections as shown in FIG. 7.

Figure 7:
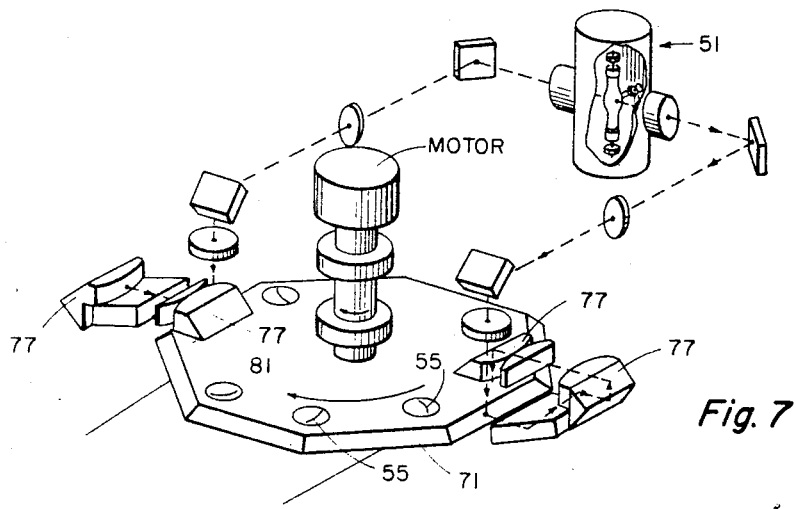
FIG. 7 is a partial isometric view from the top of the apparatus of FIG. 1.

In FIG. 7 it is seen that there are two identical following illumination systems placed on either side of the disc 53, each taking light from opposite sides of the same arc lamp 51.

With the described following illumination system, which illuminates only a small region of fixed fiber 57 at any one time, a 0.3" long Osram HBO 100 W. (140,000 lumens per mm.$^2$) mercury arc light can be used with an $f/0.7$ condenser and an area 2 mm. in diameter is illuminated around the intersection of the fibers 55 and 57. At the present time this illuminated area follows the intersection of the fibers to within 0.5 mm. and provides a spot of light whose intensity remains constant to within $\pm 15\%$ or better. Also, this source, with the crossed fiber system of this invention, retains the advantage of the 3.5 light flux gain of the crossed fiber system of this invention.

In this embodiment two complete illumination systems are provided as shown in FIG. 7. This prevents a confusing signal in the photomultipliers from a picture with a steep track nearly perpendicular to the long dimension and thus nearly parallel with one of the flying spots as shown in FIG. 1, which is the bottom view of the disc shown in FIG. 7.

Figure 8:
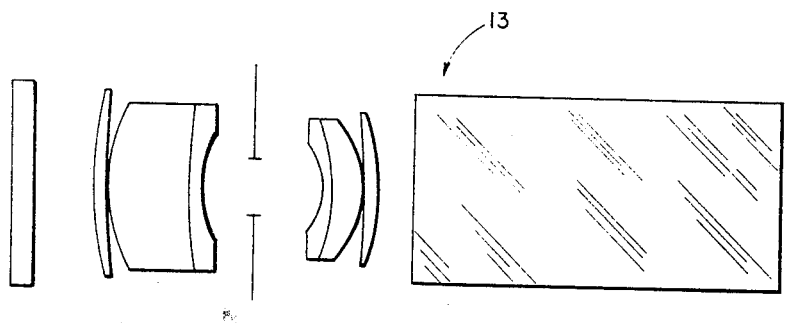
FIG. 8 is a partial cross-section of the projection lenses of the apparatus of FIG. 1.

FIG. 8 is a partial cross-section of the projection lenses e.g. lens 13. This lens is a six element lens (using high order theory) and has a focal length of 91.5 mm., an aperture of $f/4$ and is corrected for two of the strongest lines of the mercury spectrum: 436 and 546 mm. These lenses are designed for use with 6 mm. of glass in the long conjugate and a large block of glass (83.3 mm.) in the short conjugate. The original reason for the large block was to increase the physical path length between the lens and film. It has done this and it has also made possible higher lens performance. This typical projection lens shown in FIG. 8 gives a modulation of 0.65 of a 40 line per mm. sinusoidal grating 39 over the entire field. This is roughly equivalent to an image less than 8 $\mu$m. in diameter at half height and has been easily capable of a spot 15 $\mu$m. in diameter.

For maximum spot intensity the numerical aperture on the exit side of the objective should be as large as possible. For a given aperture of the objective the larger the demagnification, the larger is this numerical aperture on the exit side, although little is gained by a demagnification greater than 2. The entrance field (length of the fixed fiber) was in fact chosen to be 100 mm., giving a demagnification of 1.89.

Considering now in more detail the actual disc elements and fixed fiber for a scan length of 53 mm. the fixed fiber 57 has been 100 mm. long and has been held under tension in jaws that stop the light from source 51 from passing thereby except through the fixed fiber 57. In practice eight moving fibers 55 have been used in order that the involute curves of the fibers be not too strong. The fixed diameter of the disc 53 has been 40 cm. For a spot speed of 25 $\mu$m./$\mu$sec. and one scan in two milliseconds, one revolution of eight fibers 55 in 16 milliseconds has been provided by a 3600 r.p.m. rotation of disc 53. Such constant rotation is provided by a standard 3600 r.p.m. synchronous motor, With a suitable 2:1 gearing, however, a 7200 r.p.m. spin of disc 53 has doubled the rate of measurement. The moving fibers 55 have been mounted near the lower face of the disc 53, using curved jaws having metal plugs 81 in which the curved fibers have been mounted so that light from source 51 is stopped from passing through the disc 53 except through fibers 55.

This invention provides a simple, inexpensive, easily maintainable light spot source for producing a small, high flux, constant intensity, light spot that is easily changed in shape and easily variable in diameter down to 15 $\mu$m. or less. This invention also provides for the use of different, or very small, high flux light sources. Moreover, this invention provides a small, high flux, flying light spot which rapidly scans a very accurate straight line segment with constant velocity. This spot is particularly adapted for scanning bubble chamber picture tracks for the rapid electronic recording and interpretation or selection of bubble chamber picture tracks. It is understood, however, that the spot apparatus of this invention is useful in other pattern recognition systems and photogrammetry applications as well as in photometric applications where an accurate spot of light is required.

What is claimed is:

1. Scanning apparatus for movable bubble chamber film, comprising at least one stationary, uniform 1 mm. diameter, right circular, cylindrical glass fiber having a straight axis, at least one uniform, 1 mm. diameter, circular cross-section, cylindrical glass fiber having a curved axis, a rotatable disc having at least one plug therethrough forming jaws across an opening for supporting said curved fiber in a curve that is directed radially outwardly in a plane from the axis of rotation of said disc, said disc being rotatable in a plane and having at least one straight edge forming a mirrored face at an angle of 45° to the plane of rotation of said disc for reflecting light off said face, light source means for illuminating the movable area of intersection of the projections of said straight and curved fibers due to rotation of said disc, light from said light source means thereby shining in a beam which falls on said 45° mirrored face and is then directed down normally toward the plane of rotation of said disc and the plane of the curve of said curved fiber for transmittal through said curved and straight fibers normally to their axes in a position corresponding to the intersection of their projections to produce a 15 $\mu$m. light spot, the light spot moving in correspondence to the movement of the area of intersection of said glass fiber projections due to the rotation of said disc so as to move said spot across said film in straight line segments transverse to the direction of the film movement with a light spot movement speed corresponding to the speed of rotation of said disc, and electronic means for locating the spot coordinates and the amount of light therefrom passing through the film.

2. The invention of claim 1 including an iris in said light source means for collimating the transmission of light from said source to said curved and straight fibers, whereby said curved and straight fibers act separately as cylindrical lenses and act together as one spherical lens to form an image of said light source means having a size and shape as determined by said iris.

3. The invention of claim 2 in which said curved and straight axis fibers act to form an astigmatic image of said light source means and include means for correcting the astigmatism of said image and focusing it on said film as a small diameter real image of said light source means, said fibers and said correcting means cooperating to provide a movement of said light image in a plane transverse to the movement of said film sufficient to scan substantially the entire width of said film.

4. The invention of claim 1 including a small length mercury arc in said light source means and an objective corrected for the strong lines of the mercury arc spectrum and arranged to receive light from said curved and straight axis fibers.

(References on following page)

References Cited

UNITED STATES PATENTS

| | | | |
|---|---|---|---|
| 1,935,219 | 11/1933 | Wildhaber | 352—118 |
| 2,912,497 | 11/1959 | Parrott | 88—1 |
| 3,000,255 | 9/1961 | Iddings | 88—1 |
| 3,264,480 | 8/1966 | Zuck et al. | 250—219 |

OTHER REFERENCES

Nikitin, S. Ya.: Modern Methods of Evaluation of Bubble Chamber Photographs. Instruments and Experimental Techniques, 1961, pp. 219–226.

JEWELL H. PEDERSEN, *Primary Examiner.*

A. A. KASHINSKI, *Assistant Examiner.*